No. 642,316. Patented Jan. 30, 1900.
D. J. GALBRAITH.
PIPE CONNECTION FOR TUBS.
(Application filed Feb. 28, 1898.)

(No Model.)

Witnesses
Chas H. Smith
J. Staib

Inventor
Dennis J. Galbraith
by L. W. Serrell & Son
Attys.

THE NORRIS PETERS CO., PHOTO-LITHO., WASHINGTON, D. C.

UNITED STATES PATENT OFFICE.

DENNIS J. GALBRAITH, OF PLAINFIELD, NEW JERSEY.

PIPE CONNECTION FOR TUBS.

SPECIFICATION forming part of Letters Patent No. 642,316, dated January 30, 1900.

Application filed February 28, 1898. Serial No. 671,896. (No model.)

*To all whom it may concern:*

Be it known that I, DENNIS J. GALBRAITH, a citizen of the United States, residing at Plainfield, in the county of Union and State of New Jersey, have invented an Improvement in Pipe Connections for Tubs, &c., of which the following is a specification.

In tubs and sinks it is customary to provide faucets for hot and cold water, and these are upon the same level and project either within the tub, bath, or sink or from the back that is stationary and behind the receiving vessel, and the hot and cold water pipes usually approach the faucets from the same direction, and hence one pipe has to be above the other or behind the other in passing to the faucet, and difficulty has been experienced in making these connections without bending the pipes, and this is difficult to accomplish in a workmanlike manner, especially in view of the fact that wrought-metal pipes with screw connections are extensively employed in place of lead pipes.

The present invention is made for the purpose of connecting the hot and cold water pipes with facility to the faucets and for allowing such hot and cold water pipes to extend indefinitely at opposite sides of the faucets, so as to be united to the faucets in a range of tubs or sinks.

Each coupling is made with a screw-threaded shank to pass through the sink, tub, or sink-back and receive at the end the faucet, and the shank or body of the coupling is extended horizontally to the rear and formed as a bend that terminates with the horizontal and crossing T for receiving the screw-threaded ends of the pipes. By this connection the hot and cold water pipes can pass freely above the coupling connection and behind the tub or sink-back, it being only necessary to make the shank or body of the connection for one faucet shorter than the other, so as to accommodate the position of the pipe that is next to the tub or sink.

Figure 1:
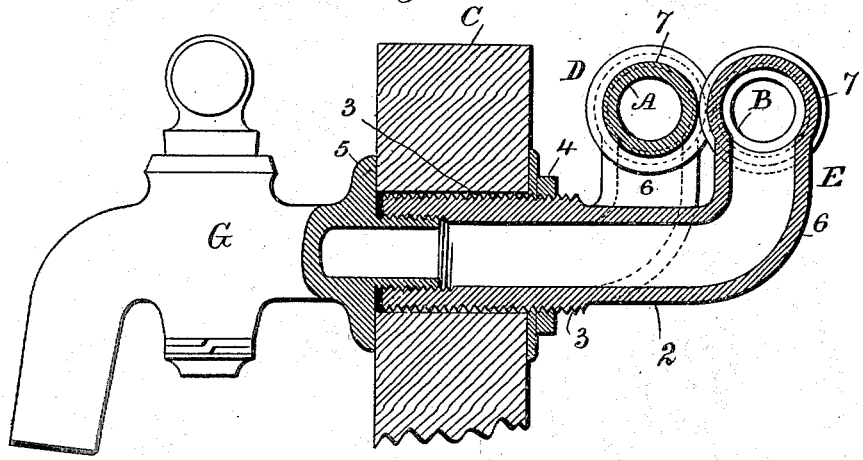
Figure 2:
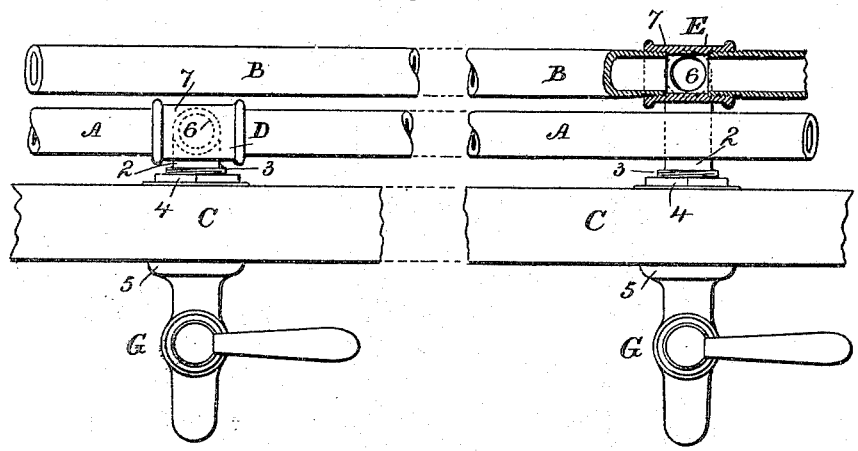

In the drawings, Figure 1 is a vertical section of the improved pipe connection, and Fig. 2 is a plan view in smaller size, representing the hot and cold water pipes and the coupling connections for the same to the tub.

The hot-water pipe A and the cold-water pipe B lie side by side horizontally and behind the tub, sink, or sink-back, a portion of which is shown at C, and through the same are the openings for the hot-water coupling D and the cold-water coupling E. Each coupling is made with a horizontal shank or body portion 2, adapted to pass through the hole in the tub or sink-back and preferably made with a screw-thread 3 for a nut and washer 4, that sets against the back of the tub or sink-back, and the faucet G is suitably connected at the open end of the horizontal body portion 2, preferably by the end of the faucet being screw-threaded to fit an internal screw-thread within the horizontal shank or body portion of the coupling, and by providing a flange 5 upon the faucet, as usual, such flange will screw tightly against the surface of the tub or sink-back, as illustrated in the drawings. Each coupling connection has a bend 6, extending up from the body portion 2, and upon the upper end of the bend is a T-coupling 7, formed with ends that are screw-threaded on the inside for the reception of the screw-threaded ends of the respective water-pipes, so that the water-pipe can extend to the coupling and also beyond where it is desired to connect with another coupling, or by applying a screw-threaded plug one end of the T may be closed. In consequence of the bend 6 extending up from the horizontal body portion 2 to the T-coupling 7 the body portion of the coupling passes down below the level of the pipe, and by varying the length of the body portion 2 the couplings are adapted to the positions of the pipes—that is to say, the hot-water coupling D has a short horizontal body portion 2 to connect with the hot-water pipe A and the shank or body portion of the cold-water coupling E is longer, so as to reach the cold-water pipe B—and these couplings not only connect with the hot and cold water pipes as they lie side by side, but they also support such pipes firmly and allow for the pipes to be extended to reach a range of faucets where there is more than one tub or sink.

This improvement becomes a new article of manufacture that greatly facilitates the connections of hot and cold water pipes to sinks and tubs.

The pipes A B occupy but little space below the top of the tub, and being above the faucets the water will run entirely out when the pipes are to be emptied to prevent injury by frost.

I claim as my invention—

A coupling for uniting the hot or cold water pipe and the faucet at a washtub or similar article, such coupling having a cylindrical body portion into either end of which the pipe is screwed, an integral downward bend and horizontal pipe at right angles to the body portion and having a parallel cylindrical exterior surface to pass through the opening in the back of the tub or similar article, and a screw-thread around the exterior surface and a nut screwed upon the same and acting to apply pressure for holding the coupling and faucet in position upon the tub or similar article.

Signed by me this 23d day of February, 1898.

DENNIS J. GALBRAITH.

Witnesses:
CLARENCE L. MURPHY,
THOMAS KENNY.